Aug. 25, 1964   W. KAFKA   3,146,361
MAGNETOHYDRODYNAMIC GENERATOR
Filed June 6, 1962   3 Sheets-Sheet 1
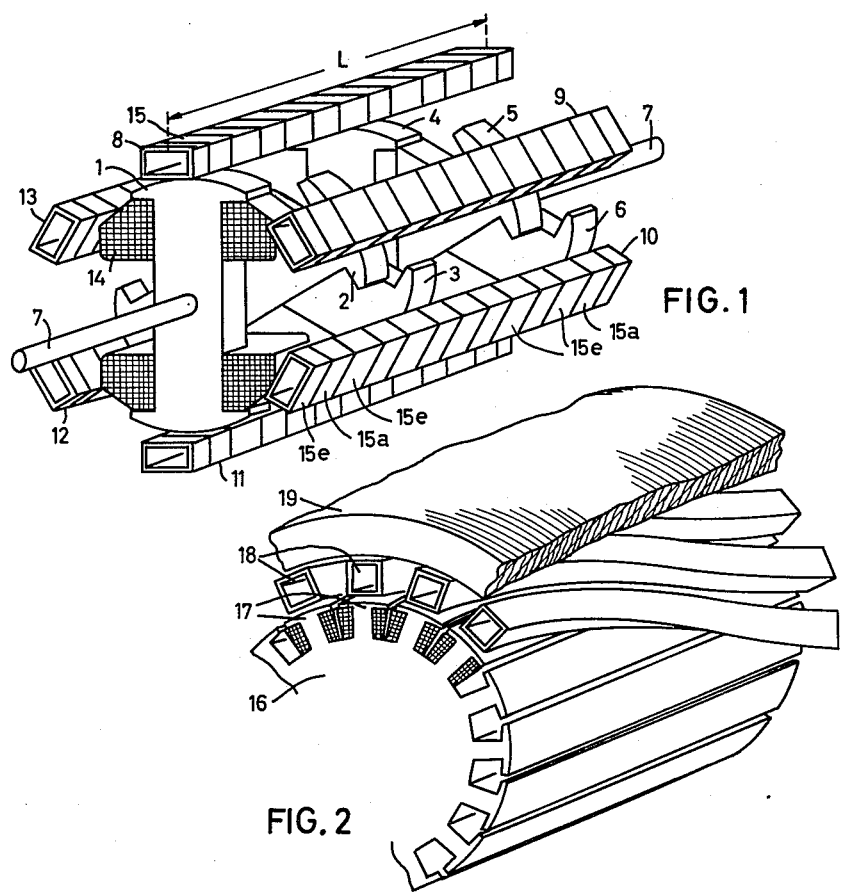
FIG. 1
FIG. 2
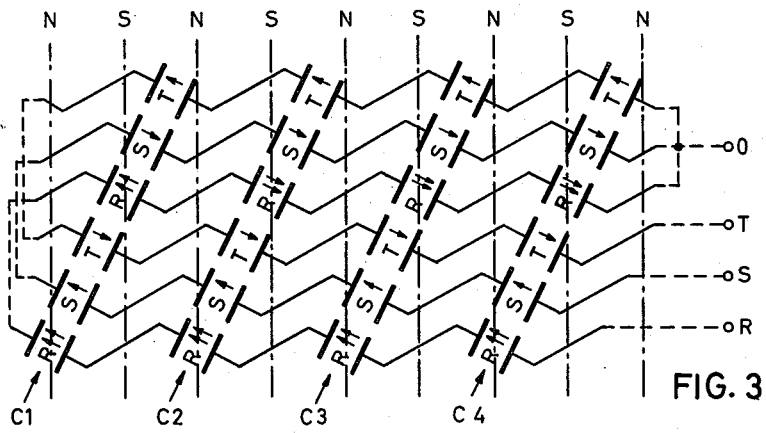
FIG. 3

Aug. 25, 1964 W. KAFKA 3,146,361
MAGNETOHYDRODYNAMIC GENERATOR
Filed June 6, 1962 3 Sheets-Sheet 2

Aug. 25, 1964   W. KAFKA   3,146,361
MAGNETOHYDRODYNAMIC GENERATOR
Filed June 6, 1962   3 Sheets-Sheet 3

United States Patent Office 3,146,361
Patented Aug. 25, 1964

3,146,361
MAGNETOHYDRODYNAMIC GENERATOR
Wilhelm Kafka, Tennenlohe, near Erlangen, Germany, assignor to Siemens-Schuckertwerke Aktiengesellschaft, Berlin-Siemensstadt, Germany, a corporation of Germany
Filed June 6, 1962, Ser. No. 200,471
Claims priority, application Germany June 7, 1961
12 Claims. (Cl. 310—11)

My invention relates to magnetohydrodynamic (MHD) generators for the direct conversion of heat into electrical energy.

Such MHD generators, as a rule, comprise a duct structure traversed by an ionized medium, for example hot gas (plasma). When the flowing medium is subjected to a magnetic field, a voltage is generated between electrodes which are located at or form part of the respective lateral duct walls. The amount of generated voltage is a function of the flow rate of the medium, the intensity of the magnetic field, and the geometric dimensions of the duct.

When applying an invariable magnetic field and a constant flow velocity of the ionized medium, the voltage generated between the electrodes is a direct voltage. When alternating or three-phase voltage is desired, a DC to AC inverter must be employed. To avoid the inverter, the MHD generator may be operated with an alternating magnetic field. This requires, for operating with technically realizable current densities in the duct, a reactive power amounting to a multiple of the effective power generated. Consequently both ways of generating alternating or muliphase current on the MHD principle involve considerable additional losses and expenditure.

It has been suggested in literature, to excite the magnetic field of an MHD generator by direct current, but to move the magnets along the duct structure in such a manner as to produce a magnetic alternating field. This concept, in theory, affords another possibility of directly producing alternating current by means of a magnetohydrodynamic generator.

Based upon this concept, it is an object of my invention to devise particularly favorable machinery for direct production of alternating or multiphase electric power in a manner more simply realizable in practice and better suitable technologically and industrially than the proposals heretofore available.

According to my invention, I provide a magnetohydrodynamic generator with a stator assembly of axially elongated ducts for the ionized medium, the ducts being peripherally distributed about the stator axis and I transversely subdivide each duct into a plurality of mutually insulated electrode system. I further equip the MHD generator with a rotor that is coaxially rotatable in the stator assembly and provided with magnet means for producing during rotation magnetic alternating fields transverse to the flow of ionized medium between the respective mutually insulated pairs or systems of electrodes.

According to another feature of my invention, the magnet poles of the rotor are sequentially correlated to the respective electrode systems along each of the axially elongated ducts, so that, during rotation of the rotor, different ones of the electrode systems in each duct are subjected to magnetic fields of respectively different instantaneous magnitudes. According to another, more specific, feature of my invention, those portions or electrode systems of the respective duct structures that are located in the same radial plane are correlated to a single-pole or two-pole magnet, and the axially adjacent excitation magnets on the rotor are angularly displaced from each other the same amount as the angular spacing between each two peripherally sequential ducts.

According to another feature, alternative to the one last mentioned, the rotor is provided with a plurality of magnet poles of which each extends over the entire effective length of the rotor, and the stator ducts and rotor poles extend in twisted or skewed relation to each other. In the latter case, the individual ducts and poles can be given straight shape by giving the rotor the shape of a hyperbolic paraboloid, in which case the poles and ducts are arranged at a given angle of skew relative to each other.

The electrode pairs or systems of respective duct portions which have the same magnetic excitation at the same time can be electrically connected with each other in parallel or series connection, a series connection being preferable. For generating three-phase current, each of the ducts preferably comprises respective electrode systems pertaining to all phases.

For full utilization of the flow of ionized medium, the effective length of the ducts occupied by electrode systems is made at least equal to the travel path of the medium during a half period of the alternating or multiphase current. The ducts then have effective lengths in the order of meters of the gas-flow velocities usually employed. Such length dimensions are constructively realizable without difficulty.

The above-mentioned and further objects, advantages and features of my invention, said features being set forth with particularity in the claims annexed hereto, will be apparent from and will be set forth in, the following description of the embodiments of MHD generators according to the invention illustrated by way of example on the accompanying drawings in which:

FIG. 1 is a simplified and schematically perspective view of a three-phase MHD generator with six two-pole excitation magnets.

FIG. 2 is a simplified perspective view of an MHD generator with a multipole rotor.

FIG. 3 is a circuit diagram of the electrode connections for MHD generators according to the invention, such as those shown in FIGS. 1, 2, 4 and 5.

Figure 4:
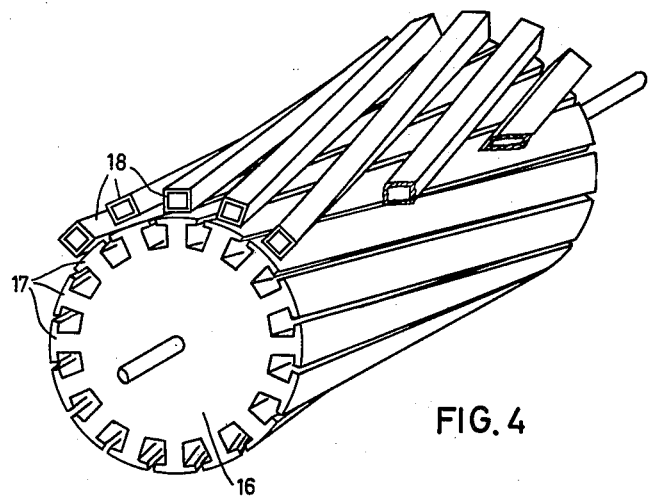
FIG. 4 is a perspective view of part of an MHD generator equipped with a rotor shaped as a hyperbolic paraboloid.

FIGS. 1, 2, 4 and 5 essentially show the geometry and design features of generators according to the invention, whereas for lucidity of illustration all electrical connections and the means for supplying the ionized medium through the ducts are omitted. As far as the electrical connections are concerned, a description is presented below of a preferred example shown in FIG. 3. The means for supplying ionized medium are schematically shown in FIG. 6. If desired, reference may be had to the following publications with respect to further details of the plasma supply means and other accessory components of a complete power generating MHD plant:

(1) Magnetohydrodynamics—Future Power Process, by Philip Spawn and Arthur Kantrowitz, Power, November 1959, page 62 and following.

(2) Magnetohydrodynamic Generation of Electric Energy, by C. G. Von Fredersdorf, Power, May 1961, page 66 and following.

(3) Magnetohydrodynamic Generators, by Stuart Way, Westinghouse Engineer, July 1960, page 105 and following.

The rotor of the generator shown in FIG. 1 of the accompanying drawings comprises six two-pole excitation magnets 1 to 6 mounted on the rotor shaft 7. The stator structure comprises six ducts 8 to 13 which are 60° displaced from each other along the periphery of the stator housing (19 in FIG. 2). Accordingly the excitation magnets 1 to 6 are angularly displaced from each other so that their respective magnetic axes define an angle of 60° between each other. The excitation magnets are provided with respective windings 14 to be energized by direct current. The direct current may be supplied through contact brushes and by means of slip rings (SE in FIG. 6) mounted on the rotor shaft 7 in the conventional manner. Only two slip rings for the positive and negative poles of the direct current supply are needed, and the windings 14 may all be connected in series or parallel relation to each other. It is of advantage to effect the interconnection of the excitation windings 14 in such a manner that the alternating voltages induced by flux pulsations will substantially or fully compensate each other. As a result, a relatively small direct voltage is sufficient for excitation purposes. The invention contemplates dispensing with the windings 14 altogether by using permanent magnets in place of cores 1 to 6.

According to FIG. 6, the ducts receive ionized medium from a combustion chamber C which contains the necessary burners B, and the medium, upon leaving the generator ducts, passes through a conduit F to a heat exchanger or other parts of the plant where the residual heat can be utilized.

The effective length of the duct structures is indicated in FIG. 1 by L. This effective length is transversely subdivided into six duct portions 15a, so that the poles of each excitation magnet pass over one active portion 15a of the ducts. The portions 15a are preferably separated from each other by insulating duct pieces 15e. It will be understood that each active duct portion 15a is provided with two mutually insulated electrodes on peripherally opposite sides of the duct. These electrodes are not shown in FIG. 1 but may correspond to those illustrated in FIG. 5 and described below. Due to the subdivision into six active duct portions 15a and consequently six electrode systems in each of the ducts shown in FIG. 1, each duct comprises two electrode systems per phase. Of course, in lieu of six duct structures, only three, or any other multiple of three, ducts may be employed for the generation of three-phase current.

The internal circuit connections of the generator is such that the electrode portions 15a of the channels that have identical magnetic excitation are electrically connected with each other. For example, the following electrode systems are to be connected in series for one of the three phases:

The electrode of one polarity in the first portion 15a of duct 8 is to be connected with the corresponding electrode in the second portion 15a of duct 9, which in turn is to be connected with the proper electrode in the third portion 15a of duct 10, whence the connection extends to the fourth portion 15a of duct 11, then to the fifth portion of duct 12, and finally to the sixth portion of duct 13. Furthermore, the electrode of the reverse polarity in the first portion 15a of duct 11 is to be connected in series with the proper electrode in the second portion of the duct 12, which in turn is to be connected with the proper electrode of the third portion of the duct 13, whence the connection extends to the fourth portion of duct 8 and then to the fifth portion of duct 9 and ultimately to the sixth portion of duct 10. The electric connections thus extend virtually in a helical configuration along the inner periphery of the stator assembly. Corresponding circuit connections are to be provided for the two other phases.

The rotary speed of the excitation magnets is of no concern to the power generated, but determines the frequency of the generated current. The generator delivers virtually the same power even at standstill, but the generated current is then unidirectional. It is preferable to select the number of the ducts and the corresponding number of the magnet poles as high as feasible in order to keep the rotational speed of the magnetic field at a low value. Then the mechanical stresses imposed upon the pole wheel remain small, and the peripheral speed of the poles relative to the gas-flow speed is negligible so that any forces occurring between the gas ducts and the magnet poles also remain negligible.

It is known that the magnetizing effect of the current flowing in the duct from electrode to electrode produces a field displacement. Such displacement can be compensated by providing for a return flow of the current within the magnetic field but outside of the gas space. This expedient for compensation of field displacement, known from German Patent 622,131, is also applicable with generators according to the present invention.

However, in lieu thereof, and in accordance with another feature of my invention, the rotating magnets are preferably provided with direct-current windings whose conductors (21, 22 in FIG. 5) may be inserted for example into grooves extending in the peripheral direction of the pole shoes. These compensating windings can be supplied with direct current through slip rings (SC in FIG. 6) similar to those employed for the excitation windings. The compensating direct current can be obtained by rectification (at R1 in FIG. 6) from the generated alternating or three-phase current. The amount of compensating current is determined by the number of turns of the compensating winding and by the type of the rectifier circuit employed.

A machine as described above with reference to FIG. 1 can be modified by arranging the excitation magnets 1 and 4 directly beside each other in the flow direction of the ionized medium, and analogously also arranging the magnets 2 and 5, as well as the magnets 3 and 6, close to each other. In this case the compensating windings can be provided with short axial front connections in the pole shoes.

The rotor is driven from a suitable drive motor M (FIG. 6) whose speed determines the frequency of the generated current. The motor M is shown energized from the generated three-phase current through a rectifier under control by a speed-control rheostat CR1. When operating the MHD generator in parallel relation to an existing three-phase power line, the drive motor may consist of a synchronous motor energized from the line. By angularly displacing the vectorial position of the rotor relative to the rotating field, the delivery of active current from the MHD generator to the three-phase power line can be adjusted. The active power can be controlled in known manner by varying the direct-current excitation of the magnets or by varying the essential data (such as speed, temperature) of the ionized medium. Thus, according to FIG. 6, the direct-current excitation of the magnets, supplied from the generated three-phase current through a rectifier R2, can be adjusted by means of a control rheostat CR2.

Instead of providing the rotor with individual excitation magnets according to FIG. 1, a multipole rotor of the round or drum type may be employed as is illustrated in FIG. 2. The rotor 16 has a multiplicity of individual pole shoes 17 extending over the entire axial length of the rotor. The ducts 18 for the flowing ionized medium extend helically along the inner periphery of the partially illustrated stator structure 19. At a high pole number of the rotor, an only slight pitch of the helical ducts is sufficient so that they become approximately straight. According to FIG. 1, each of the ducts is subdivided into mutually separate, active portions, each containing two electrodes. For generating three-phase current, three such electrode portions, or a multiple of three, are provided, this being not shown in FIG. 2 for simplicity.

Figure 5:
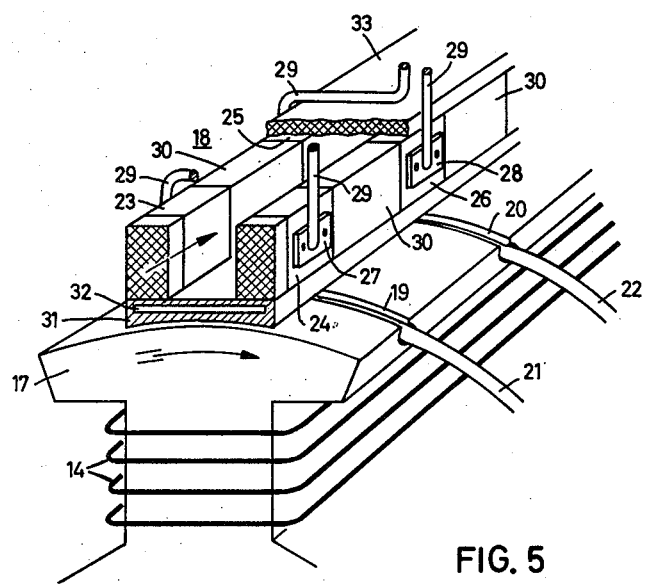
FIG. 5 shows in perspective a detail of a rotor magnet pole together with one of the duct structures of the MHD generator.
Figure 6:
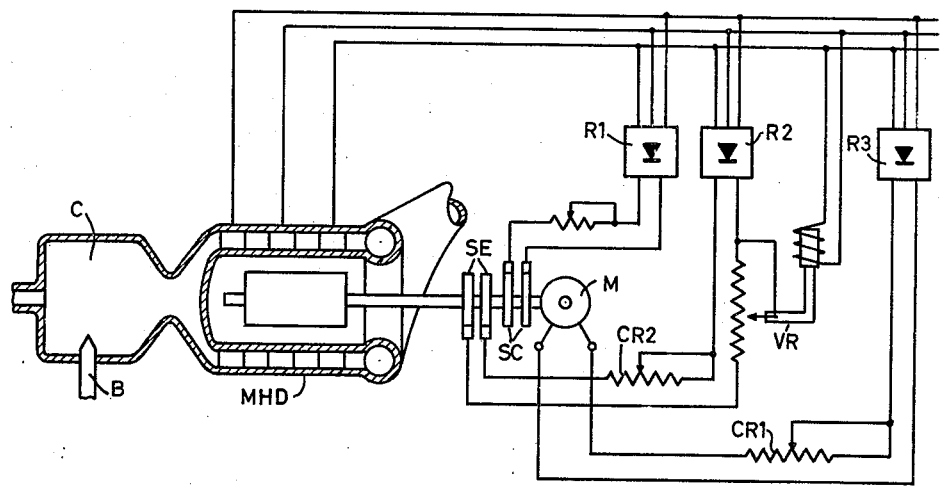
FIG. 6 is a schematic diagram of an MHD generator plant.

As schematically indicated in FIG. 2, the stator structure 19 is composed of a stack of laminations, a corresponding laminated design being also preferable for the machines shown in FIGS. 1, 4 and 5.

The circuit diagram of FIG. 3 relates to the internal connections of the individual duct portions. The diagram is drawn in developed form with reference to an eight-pole rotor (N, S, N, S etc.) and for four ducts (C1 to C4) each having six electrode systems. The same diagram, of course, is also applicable to a corresponding portion of a generator having a greater total number of poles and ducts, a corresponding supplementation of the circuit diagram for such larger generators being directly derivable from FIG. 3. The broken lines in FIG. 3 indicate an example of an applicable external connection for the three phases.

According to FIG. 3, the machine is provided with four external terminals O, T, S, R. Terminal O represents the star point of a Y connection and terminals P, S, R are the output terminals for the three-phase voltages. The designations of the terminals are repeated between each two electrodes of those duct portions that are serially connected with one another between the star point O and the respective terminals P, S, R. The arrows between the two electrodes of each duct section indicate an example of current flow at a selected moment.

If it is desired to give the ducts a completely straight design, the rotor 16 can be given the shape of a hyperbolic paraboloid according to FIG. 4. Such a paraboloid results geometrically from rotating a straight line about an axis with the line in a fixed skewed, i.e. non-intersecting, position to the axis. The pole shoes 17 and the ducts 18 can then be arranged at the periphery of the hyperbolic paraboloid in the direction of the straight-line generatrix. The subdivision of the ducts into individual portions and their electrical connection may correspond to that shown in FIG. 3.

Relative to the internal circuit connections of the MHD generator, attention is to be given to providing for lowest feasible potential differences between adjacent duct portions, and for sufficiently long intermediate duct pieces between adjacent electrodes so that the spurious currents, resulting in the ionized medium from the electric fields between the electrodes, amount to only a fraction of the useful current. Such spurious currents reduce the available maximum power output of the generator and hence impair its efficiency. However, they constitute an only slight over-all power loss because they contribute to heating the flowing medium.

Among the criteria that determine the angle of inclination between the ducts and the axis of rotation are the forces that are transmitted upon the rotor in dependence upon the load imposed upon the generator. By properly adapting the rotor speed and the speed of the flowing medium, the torque transmitted to the rotor can be made equal to zero. Then the driving power for the rotor is a minimum. In some cases it is of advantage to derive the driving power for the rotor from the MHD generator itself, and to select the inclination of the ducts relative to the axis of rotation so that the rotor, after being started, will continue running without external driving power.

For operating MHD generators according to the invention independently of existing three-phase power lines, it is preferable, as a rule, to provide for voltage control and regulation of the direct-current excitation applied to the magnets. The excitation currents can be taken from the MHD generator through a rectifier. Thus, according to FIG. 6, the excitation current supplied through the slip rings SE is taken from rectifier R2 and cannot only be controlled by a control rheostat CR2 but also regulated by a voltage regulator VR in dependence upon the output voltage of the MHD generator. The excitation from the generated power is comparable with the self-excitation of a normal dynamo-electric generator, but when applied to MHD generators usually requires the provision of additional means for starting the generator. For example, the self-excitation can be aided by a provision of permanent magnets.

When the generator operates on a load that is not purely ohmic, the resulting reactive currents may affect the voltage amplitude and wave shape. In order to minimize such effects it is advisable to keep the internal resistance of the MHD generator small in comparison with the external load resistance. For this purpose a properly dimensioned compensating winding is particularly important. As mentioned above, such a compensating winding may consist of conductors that extend over the pole shoe which for this purpose is provided with suitable grooves. Such a provision of compensating windings is shown in FIG. 5. The pole shoe 17, carrying the excitation winding 14, is provided with grooves 19, 20 at the respective locations of the individual electrode portions of the ducts. The conductors 21, 22 of the compensating winding extend through the grooves. According to FIG. 5, only one turn of the compensating winding is provided per electrode portion of each duct. In lieu thereof, several turns of the compensating winding per duct portion may be provided.

The duct structure 18 according to FIG. 5 comprises several mutually insulated portions, each having its own electrode system. The electrodes of the forward portion are denoted by 23 and 24, the electrodes of the second portion by 25 and 26. The electrodes, which form side walls of the duct structure, may consist of graphite, for example. The current is taken off by means of copper plates 27, 28 fastened to the electrodes. Connected to the copper plates are respective conductors 29. The electrode systems are separated from each other by insulating intermediate duct pieces 30. The top and bottom walls of the duct structure consist of plates 31, 33, preferably made of heat-resistant material such as refractory ceramic. The bottom plate 31 is shown provided with a channel 32 for cooling liquid. The top plate 33 closes the duct against the housing structure of the stator assembly. One of the conductors 29 in each electrode system is shown to extend close to cover plate 33 in parallel relation to the direction of current flow between the two electrodes so as to obtain field-displacement compensation as mentioned above with reference to German Patent 622,131.

Figure 7:
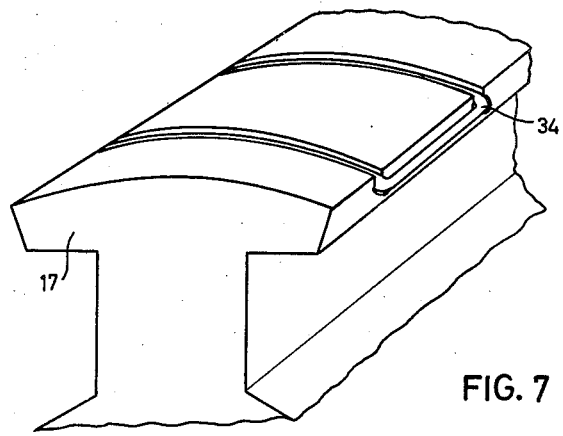
FIG. 7 is a perspective detail of a rotor magnet pole in FIG. 5 having a damper winding for compensating some of the effects of a reactive load.

While under active current-loading, the generated current causes only a displacement of the main magnetic field; a load by reactive current has a pulsating demagnetizing effect. This effect can be compensated by mounting a damper winding on the magnet poles. Such damper winding may consist of conductors which extend through grooves in the pole shoes, similar to the conductors 21, 22 of the compensating winding, but which in addition are short-circuited within the pole by axial connecting leads. Such a damper winding is shown at 34 in FIG. 7.

To those skilled in the art it will be obvious upon a study of this disclosure that my invention permits of many other embodiments depending upon the generated power output required, as well as upon other requirements and desiderata of a particular application. Regardless of such modifications, the subdivision of the ducts into individual electrode portions in conjunction with the provision of a rotating direct field-producing rotor affords an economical direct production of alternating or multiphase current on the MHD principle.

I claim:

1. A magnetohydrodynamic generator comprising a stator assembly of axially elongated ducts for ionized medium, said ducts being peripherally distributed about the stator axis and being each transversely subdivided into a plurality of mutually insulated electrode systems, and a rotor coaxially rotatable in said stator assembly and having magnet means for producing during rotation magnetic alternating fields transverse to the flow of ionized medium between said respective electrode systems, whereby the generator furnishes alternating output voltage.

2. A magnetohydrodynamic generator comprising a stator assembly of axially elongated ducts for ionized medium, said ducts being peripherally distributed about the stator axis and being each transversely subdivided into a plurality of mutually insulated electrode systems, and a rotor coaxially rotatable in said stator assembly and having magnet means with unidirectional field poles for producing during rotation magnetic alternating fields transverse to the flow of ionized medium between said respective electrode systems, said poles being in sequential magnetic correlation to said respective electrode systems along each of said ducts so that, during rotation of said rotor, different ones of said electrode systems are subjected to magnetic fields of respectively different instantaneous magnitudes.

3. A magnetohydrodynamic generator comprising a stator assembly of axially elongated ducts for ionized medium, said ducts being peripherally distributed about the stator axis and being each transversely subdivided into a plurality of mutually insulated electrode systems arranged in respective transverse planes common to respective electrode systems of the other ducts, and a rotor coaxially rotatable in said stator assembly and having a plurality of unidirectionally poled magnets whose pole axes extend in said respective planes and are angularly spaced from each other in accordance with the angular spacing between said ducts.

4. A magnetohydrodynamic generator comprising a stator assembly of axially elongated ducts for ionized medium, said ducts being peripherally distributed about the stator axis and being each transversely subdivided into a plurality of mutually insulated electrode systems, and a rotor coaxially rotatable in said stator assembly and having magnetically unidirectional field poles extending axially over the active length of the rotor for producing during rotation magnetic alternating fields transverse to the flow of ionized medium between said respective electrode systems, said ducts of said stator assembly and said magnet poles of said rotor having twisted shape one relative to the other.

5. A magnetohydrodynamic generator comprising a stator assembly of axially elongated ducts for ionized medium, said ducts being peripherally distributed about the stator axis and being each transversely subdivided into a plurality of mutually insulated electrode systems, and a rotor coaxially rotatable in said stator assembly and having magnetically unidirectional field poles extending axially over the active length of the rotor for producing during rotation magnetic alternating fields transverse to the flow of ionized medium between said respective electrode systems, said rotor having the shape of a hyperbolic paraboloid, said magnet poles as well as said ducts being individually straight and extending in skewed relation to each other.

6. A magnetohydrodynamic generator comprising a stator assembly of axially elongated ducts for ionized medium, said ducts being peripherally distributed about the stator axis and being each transversely subdivided into a plurality of mutually insulated electrode systems, and a rotor coaxially rotatable in said stator assembly and having magnet means with unidirectional field poles for producing during rotation magnetic alternating fields transverse to the flow of ionized medium between said respective electrode systems, said poles being in sequential magnetic correlation to said respective electrode systems along each of said ducts so that, during rotation of said rotor, different ones of said electrode systems are subjected to magnetic fields of respectively different instantaneous magnitudes, and respective circuit means electrically interconnecting each group of electrode systems that have the same instantaneous magnetic excitation in all of said ducts.

7. In an MHD-generator according to claim 6, said circuit means comprising generator output terminals, and conductors connecting each of said groups of electrode systems in series to one of said respective terminals.

8. In an MHD-generator according to claim 2, comprising three-phase output leads, each of said ducts having electrode systems for all three phases connected to said respective leads.

9. In an MHD-generator according to claim 1, said duct having between its two outermost electrode systems an effective length at least equal to the travel of the flowing medium in a half-period of the alternating current.

10. An MHD-generator according to claim 2, comprising compensating windings extending peripherally on said rotor poles.

11. In an MHD-generator according to claim 2, said field poles having respective short-circuited damper windings.

12. In an MHD-generator according to claim 2, said ducts extending relative to the axis of rotation at an angle of skew adapted to the rotor speed and flow speed of the medium to reduce the torque transmitted to the rotor to substantially the zero or driving value.

References Cited in the file of this patent

UNITED STATES PATENTS 2,929,326     Ingels _____ Mar. 22, 1960

FOREIGN PATENTS 128,542     Russia _____ Mar. 31, 1959